United States Patent [19]
Malen et al.

[11] 3,821,249
[45] June 28, 1974

[54] DIBENZOTHIAZEFIN DERIVATIVES

[75] Inventors: Charles Malen, Fresnes; Bernard Danree, St. Germain en Laye; Jean-Claude Poignant, Wissous, all of France

[73] Assignee: Societe en nom collectif Science Union et Cie, Societe Francais de Recherche Medicale, Suresnes, France

[22] Filed: Oct. 30, 1972

[21] Appl. No.: 301,997

Related U.S. Application Data

[62] Division of Ser. No. 019,503, March 13, 1970, Pat. No. 3,758,528.

[52] U.S. Cl............................................ 260/327 B
[51] Int. Cl............................................ C07d 93/42
[58] Field of Search ................................ 260/327 B

[56] References Cited
UNITED STATES PATENTS
3,758,528   9/1973   Malen et al.......................... 260/404

Primary Examiner—Henry R. Jiles
Assistant Examiner—Cecilia M. S. Jaisle
Attorney, Agent, or Firm—Gordon W. Hueschen; John T. Reynolds

[57] ABSTRACT

Tricyclic compounds of the formula:

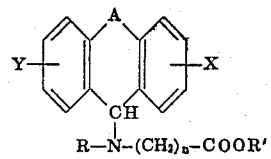

wherein:
A is $-(CH_2)_m-$, $-CH=CH-$, $-(CH_2)_p-O-$, $-(CH_2)_p-S-$, $-(CH_2)_p-SO_2-$, $-(CH_2)_n-NR_1$ or $-SO_2-NR_2-$ in which $m$ is 1, 2 or 3, $p$ is 1 or 2, $R_1$ is hydrogen or lower alkyl and $R_2$ is lower alkyl:

X and Y are hydrogen or halogen:
R and R' are hydrogen or lower alkyl, and
$n$ is an integer of from 1 to 12 inclusive.

These compounds possess psychostimulant, antidepressive, analgesic, antitussive, antihistaminic and gastric antisecretory properties.

7 Claims, No Drawings

DIBENZOTHIAZEFIN DERIVATIVES

This is a Division of application Serial No. 019,503, filed March 13, 1970, now U.S. Patent No. 3,758,528, issued Sept. 11, 1973.

The present invention provides tricyclic compounds of the general formula I

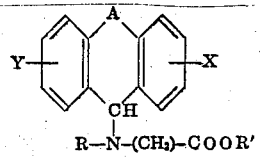

wherein:
- —A is a bridge selected from the following radicals: $-(CH_2)_m-$, $-CH=CH-$, $-(CH_2)_p-O-$, $-(CH_2)_p-S-$, $-(CH_2)_p-SO_2-$, $-(CH_2)_p-NR_1-$ and $-SO_2-NR_2-$, in which:
- $m$ is an integer of from 1 to 3 inclusive;
- $p$ is an integer selected from 1 and 2;
- $R_1$ is selected from the group consisting of a hydrogen atom and a lower alkyl radical containing from 1 to 5 carbon atoms inclusive, and
- $R_2$ is a lower alkyl radical containing from 1 to 5 carbon atoms inclusive;
- X and Y are the same or different and each is selected from the group consisting of a hydrogen atom and a halogen atom selected from fluorine, chlorine and bromine atoms;
- R and R' are the same or different and each is selected from the group consisting of a hydrogen atom and a lower alkyl radical containing from 1 to 5 carbon atoms inclusive in a straight or branched chain; and
- $n$ is an integer of from 1 to 12 inclusive.

The compounds of the general formula I in which R' represents a hydrogen atom are amphoteric compounds which yield metal salts with bases of the alkali or alkaline earth metals, such, for example, as sodium, potassium or calcium hydroxide, carbonate and bicarbonate, and salts with inorganic or organic acids, such, for example, as hydrochloric, hydrobromic, sulfuric, phosphoric, acetic, propionic, maleic, fumaric, methane sulfonic, tartaric, citric, oxalic and benzoic acids. The compounds of general formula I in which R' represents an alkyl radical are basic compounds which yield salts with inorganic or organic acids mentioned above. All these salts are included in the present invention.

Furthermore, some compounds of the general formula I possess an asymmetric carbon atom and thus exist in the form of optical isomers. These optical isomers are included in the present invention.

The present invention also provides a process for preparing the compounds of the general formula I, which comprises condensing a halogenated derivative of general formula II:

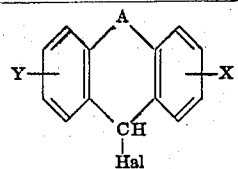

in which A, X and Y have the meanings given above and Hal represents a chlorine or bromine atom, with an aliphatic ω-amino-ester of general formula III:

$$R - NH - (CH_2)_n - COOR' \quad \text{III}$$

in which R and n have the values given above and R' represents a lower alkyl radical containing 1 to 5 carbon atoms, so as to yield the compounds of the general formula I in which R' is a lower alkyl radical, and then saponifying the ester so obtained to yield a compound of the general formula I in which R' is a hydrogen atom.

The condensation is carried out in a suitable organic solvent, for example, nitromethane, acetonitrile or dimethylformamide, in the presence of an acceptor of the hydracid formed during the reaction. This acceptor may be an excess of the ω-amino-ester (III), a tertiary amine, a pyridine base, or an alkali or alkaline earth carbonate or bicarbonate. The reaction is generally slightly exothermic and takes place at a temperature preferably within the range of from 20° to 100°C.

The saponification of the resulting ester is carried out either in an akaline aqueous alcoholic medium or in a strongly acid aqueous alcoholic medium.

The halogenated starting compounds II have been prepared by methods which are in themselves known starting from the corresponding hydroxylated compounds, which are either treated with dry hydrochloric acid or with thionyl chloride. These hydroxylated compounds are themselves prepared from the corresponding ketones, the majority of which are known compounds.

The physical constants of the new starting materials, whether they be ketones, alcohols or halides, are given in the Examples which follow.

The undermentioned Examples illustrate the invention. The melting points are, unless otherwise stated, determined on a Kofler block. They are in fact decomposition points, the determination of which is rather imprecise.

EXAMPLE 1

7-[dibenzo (a,d) cycloheptadien-5-yl] aminoheptanoic acid hydrochloride

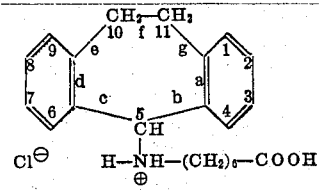

6.5 g of 5-chloro-10, 11-dihydro-5H-dibenzo (a,d)-cycloheptene in 60 ml of nitromethane and 10.8 g of ethyl 7-aminoheptanoate in 12 ml of nitromethane were mixed at ambient temperature. The reaction was slightly exothermic. The reaction mixture was left to stand overnight and the solvent was evaporated in vacuo. The residue was taken up in normal hydrochloride acid and the resulting precipitate was filtered off.

10.5 g of crude ethyl 7-[dibenzo (a,d) cycloheptadien-5-yl] aminoheptanoate hydrochloride were obtained, of which a sample recrystallized from benzene gave a pure product melting instantaneously at 166° to 168°C.

The hydrochloride of the crude ester obtained above was added to 25 ml of 2N hydrochloric acid. The whole was kept under reflux for 2 hours. The material dissolved and a new hydrochloride then reprecipitated. After cooling, the hydrochloride of the crude acid was filtered off, washed with iced water and then recrystallized from distilled water. 5.7 g of 7-[dibenzo (a,d) cycloheptadien-5-yl] aminoheptanoic acid hydrochloride were obtained, melting instantaneously at 226° to 230°C.

EXAMPLES 2 14 11

The derivatives of which substituents and melting points are collected together in the Table below were prepared according to the process described in Example 1:

corresponding alcohol, melting point 110°-115°C, were obtained. After recrystallization from aqueous ethanol, 3.2 g of 8-chloro-dibenzo (b,e) thiepin-11-ol, melting at 115°-117°C, were obtained.

2.8 g of 8-chloro-dibenzo (b,e) thiepin-11-ol were added to 50 ml of thionyl chloride. The mixture was kept under reflux for 1 hour and the excess of reagent was then evaporated in vacuo. The crystalline residue was recrystallized from cyclohexane. 2 g of 8,11-dichloro-dibenzo (b,e) thiepine, melting at 121°-123-

Table 1

| Ex | A | X | Y | R | R' | n | form isolated | instantaneous melting point |
|---|---|---|---|---|---|---|---|---|
| 2 | —CH$_2$—CH$_2$— | H | H | H | H | 5 | hydrochloride | 210°C |
| 3 | —CH$_2$—CH$_2$— | H | H | H | H | 7 | hydrochloride | 180 – 185°C |
| 4 | —CH$_2$—CH$_2$— | H | H | H | H | 10 | hydrochloride | 142 – 144°C |
| 5 | —CH$_2$—CH$_2$— | Cl-2 | H | H | H | 6 | hydrochloride | 180°C |
| 6 | —CH$_2$—CH$_2$— | Cl-3 | H | H | H | 6 | hydrochloride | 210°C |
| 7 | —CH$_2$—CH$_2$—CH$_2$— | H | H | H | H | 6 | hydrochloride | >260°C |
| 8 | —CH=CH— | H | H | H | H | 5 | free acid | 120°C |
| 9 | —CH=CH— | H | H | H | C$_2$H$_5$ | 6 | hydrochloride | 158 – 160°C |
| 10 | —CH=CH— | H | H | H | C$_2$H$_5$ | 7 | hydrochloride | 150°C |
| 11 | —CH=CH— | H | H | H | C$_2$H$_5$ | 10 | hydrochloride | 128 – 130°C |

EXAMPLE 12 dl 7-[-chloro-dibenzo (b,e) thiepin-11-yl] aminoheptanoic acid hydrochloride

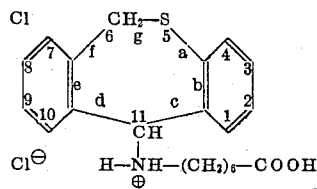

2 g of 4-chloro (α-phenylthio) toluic acid were added to a solution of 7.2 g of phosphorus pentoxide, P$_2$O$_5$, in 5 ml of phosphoric acid. The reaction mixture was kept at 100°C for 2 hours whilst stirring. It was decomposed with ice and then extracted with benzene. The benzene phase was washed with dilute sodium hydroxide solution and then with water, dried and evaporated. The residue was recrystallized from cyclohexane. 1 g of 8-chloro-dibenzo (b,e) thiepin-11-one, melting (micro-Kofler) at 152°-153°C, was obtained.

4.5 g of 8-chloro-dibenzo (b,e) thiepin-11-one in 50 ml of methanol were treated with 1.31 g of sodium borohydride. After the usual treatment, 4 g of the crude °C, were obtained.

7.2 g of 8,11-dichloro-dibenzo (b,e) thiepine were reacted with 9 g of ethyl 7-aminoheptanoate in nitromethane in accordance with the process described in Example 1. 10.9 g of a product containing 99 percent of ethyl 7-[8-chlorodibenzo (b,e) thiepin-11-yl] aminoheptanoate were finally obtained in the form of a non-crystalline gum. 9.9 g of this ester were treated with 60 ml of normal hydrochloric acid and refluxing was continued for 2 hours. The whole was evaporated in vacuo. The residue was taken up in 50 ml of acetonitrile. The whole was heated under reflux, and then filtered while hot. The filtered and dried product was then recrystallized from distilled water. 6 g of dl 7-[8-chloro-dibenzo (b,e)-thiepin-11-yl] aminoheptanoic acid hydrochloride, melting instantaneously at 200°-210°C, were obtained.

EXAMPLES 13 – 27

The derivatives of which the substituents and melting points are collected together in the Table below were prepared according to the process described in Example 12. This Table also contains the melting points of the starting materials used where these are new products:

Table 2

| Ex | A | X | Y | R | R' | n | form isolated | instantaneous melting point | melting point of the corresponding chlorinated derivative | melting point of the corresponding hydroxyl derivative |
|---|---|---|---|---|---|---|---|---|---|---|
| 13 | —CH$_2$—O— | H | H | H | C$_2$H$_5$ | 5 | hydrochloride | 180°C | not isolated in the pure state | — |
| 14 | —CH$_2$—O— | Cl-2 | H | H | H | 6 | hydrochloride | 204°C | 122 – 126°C | 138 – 140°C |
| 15 | —CH$_2$—O— | Cl-3 | H | H | H | 6 | hydrochloride | 190°C | 80 – 84°C | 113 – 115°C |
| 16 | —CH$_2$—O— | F-2 | H | H | H | 6 | hydrochloride | 206°C | 154 – 158°C | 76 – 78°C |
| 17 | —CH$_2$—O— | H | Cl-8 | H | H | 6 | hydrochloride | 180°C | 110 – 115°C | 104 – 108°C |
| 18 | —CH$_2$—S— | Cl-3 | H | CH$_3$ | H | 5 | free acid | 140 – 142°C | not isolated in the pure state | — |

Table 2 – Continued

| Ex | A | X | Y | R | R' | n | form isolated | instantaneous melting point | melting point of the corresponding chlorinated derivative | melting point of the corresponding hydroxyl derivative |
|---|---|---|---|---|---|---|---|---|---|---|
| 19 | —CH₂—S— | Cl-3 | H | H | H | 6 | hydro-chloride | 210°C | not isolated in the pure state | — |
| 20 | —CH₂—S— | Cl-3 | Cl-9 | H | H | 6 | hydro-chloride | 210°C | 100 – 102°C | 160 – 162°C |
| 21 | —CH₂—S— | Cl-2 | H | H | H | 5 | hydro-chloride | 200 – 203°C | 104 – 106°C | 158 – 160°C |
| 22 | —CH₂—S— | Cl-3 | H | H | H | 5 | hydro-chloride | 181 – 182°C | not isolated in the pure state | 140 – 142°C |
| 23 | —CH₂—S— | Cl-2 | H | H | H | 6 | hydro-chloride | — | — | — |
| 24 | —CH₂—S— | Cl-3 | H | H | H | 6 | hydro-chloride | 200°C | — | — |
| 25 | —CH₂—SO₂— | Cl-3 | H | H | H | 5 | hydro-chloride | 206°C | — | — |
| 26 | —CH₂—CH₂—S— | H | H | H | H | 5 | hydro-chloride | 210 – 212°C | — | — |
| 27 | —CH₂—CH₂—S— | H | H | H | H | 6 | hydro-chloride | 247 – 248°C | — | — |

EXAMPLE 28 dl-6-[10,10-dioxo-11-methyl dibenzo (c,f) thiazepin (1,2)-5-yl]-aminohexanoic acid

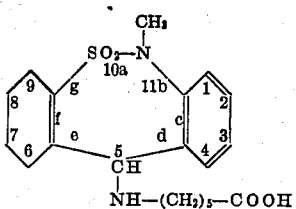

A solution of 8 g (0.05 mol) of freshly distilled ethyl 6-aminocaproate in 10 ml of nitromethane were added all at once to a well-stirred suspension of 7.3 g (0.025 mol) of 5-chloro-10,10-dioxo-11-methyl-dibenzo (c,f) thiazepine (1,2) in 40 ml of distilled nitromethane. A slight exothermic reaction was observed with the temperature rising to 35°C and the halogenated derivative dissolving completely. Stirring was then continued for 30 minutes. The reaction mixture was evaporated in vacuo. The residue was taken up in 30 ml of water. The insoluble oil which separated out was extracted with benzene and the benzene phase was washed with water and then dried over sodium sulphate. The solvent was evaporated in vacuo and 10.7 g of crude oily ethyl dl 6-[10,10-dioxo-11-methyldibenzo (c,f) thiazepin (1,2)-5-yl] aminohexanoate were obtained, in which the content of pure product determined by measurement with perchloric acid in an acetic acid medium is 95 percent.

10.4 g of this ester thus obtained were treated with 1 g of sodium hydroxide dissolved in 60 ml of ethanol and 10 ml of water. The mixture was kept under reflux for 45 minutes and then evaporated in vacuo. The residue was taken up in 30 ml of water and the aqueous solution was extracted with ether. The aqueous phase was cautiously acidified to pH 4.5 – 5. The acid which precipitated was extracted with chloroform. The chloroform phase was washed and dried, and then evaporated. The 7.3 g of crude acid thus obtained was recrystallized from 10 ml of ethanol and 5.5 g of dl 6-[10,10-dioxo-11-methyl-dibenzo (c,f) thiazepin (1,2)-5-yl] amino-hexanoic acid were thus obtained, melting instantaneously at 118°C.

EXAMPLE 29

Ethyl dl 3-[10,10-dioxo-11-methyl-dibenzo (c,f) thiazepin (1,2)-5-yl] aminopropionate hydrochloride

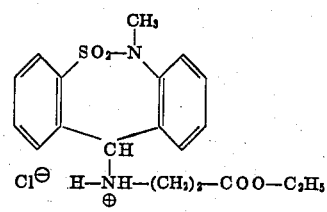

Working as in Example 28 and starting from 11.6 g of 5-chloro-10-dioxo-11-methyl-dibenzo (c,f) thiazepine (1,2) and 9.4 g of ethyl β-amino-propionate, 15 g of dl 3-[10-dioxo-11-methyl-dibenzo (c,f) thiazepin (1,2)-5-yl]aminopropionate were obtained, containing 94 percent of pure product as determined by measurement with perchloric acid.

15 g of this crude ester were dissolved in 150 ml of anhydrous ether and treated with a solution of hydrochloric acid in anhydrous ether. The hydrochloride precipitated and was filtered off, washed with ether and dried. 15.5 g of crude ethyl dl 3-[10-dioxo-11-methyl-dibenzo (c,f) thiazepin-(1,2)-5-yl] aminopropionate hydrochloride were obtained, which on recrystallisation from water yielded 12.3 g of a pure product, melting instantaneously at 210°C.

EXAMPLE 30

Sodium 7-[8-chloro-10-dioxo-11-methyl-dibenzo (c,f) thiazepin-(1,2)-5-yl] aminoheptanoate

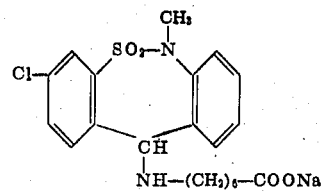

A solution of 27.6 g (0.16 mol) of freshly distilled ethyl 7-amino-heptanoate in 40 ml of nitromethane was added all at once and with mechanical stirring to a suspension of 26.2 g (0.08 mol) of 5,8-dichloro-10-dioxo-11-methyl-dibenzo (c,f) thiazepine (1,2) in 120 ml of nitromethane. The whole was heated to 55°C for 30 minutes, the solvent was then evaporated in vacuo and the residue was taken up in water. The crude ester was extracted with ether. After evaporation of the ether 36 g of crude ester were obtained, and 30 g (0.065 mol) thereof were treated under reflux with a solution of 2.8 g (0.07 mol) of sodium hydroxide in 75 ml of ethanol and 25 ml of water. After one hour's refluxing, the alcohol was evaporated in vacuo. The residue was taken up in 150 ml of water. The mixture was twice extracted with 75 ml of chloroform and the aqueous phase was evaporated in vacuo. The sodium salt was then dissolved in 150 ml of chloroform, the solution was dried over sodium sulphate and the product precipitated with anhydrous ether.

The salt was filtered off, washed with ether and dried at 50°C. 13 g of sodium 7-[8-chloro-10-dioxo-11-methyl-dibenzo (c,f) thiazepin (1,2)-5-yl] aminoheptanoate, melting with decomposition at about 180°C, were obtained.

EXAMPLE 31 dl 8-[8-chloro-10,10-dioxo-11-methyl-dibenzo (c,f) thiazepin (1,2)-5-yl] aminooctanoic acid hydrochloride.

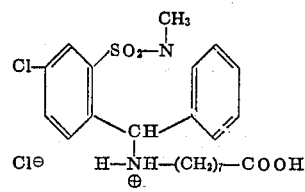

9.35 g (0.050 mol) of freshly prepared ethyl 8-aminooctanoate were added all at once and while stirring to a suspension of 8.2 g (0.025 mol) of 5,8-dichloro-10,10-dioxo-11-methyl-dibenzo (c,f) thiazepine (1,2) in 60 ml of nitromethane. The whole was kept at 45°– 50°C for 20 minutes, the solvent was then evaporated in vacuo and the crude ester was extracted as in the preceding Examples.

The crude ester was added to 25 ml of 2 N hydrochloric acid and the mixture is boiled for 1 hour, and evaporated to dryness in vacuo. The residue was recrystallized from 75 ml of acetonitrile and 7 g of dl 8-[8-chloro-10,10-dioxo-11-methyl-dibenzo (c,f) thiazepin (1,2)-5-yl] aminooctanoic acid hydrochloride, melting instantaneously at 188°– 190°C, were obtained.

EXAMPLES 32 – 48

The derivatives of which the substituents and melting points were collected in the Table below were prepared according to the process described in Example 28 to 31. The 5-chloro-10,10-dioxo-11-$C_1$ to $C_5$-alkyl-dibenzo (c,f) thiazepines (1,2) which are the starting materials used in Examples 28 to 48 are described in our French Patent No. 1,566,191.

TABLE 3

| Ex. | A | X | Y | R | R' | n | Form isolated | Instantaneous melting point, °C. |
|---|---|---|---|---|---|---|---|---|
| 32 | CH₃ \| –CO₂–N– | H | H | H | H | 1 | Free acid | 220 |
| 33 | Same as above | H | H | H | $C_2H_5$ | 1 | Hydrochloride hemihydrate | 180 |
| 34 | do | H | H | $CH_3$ | Na | 3 | Dihydrate | 150 |
| 35 | do | Cl-2 | H | H | H | 5 | Free acid hemihydrate | 115 |
| 36 | do | Cl-3 | H | H | H | 5 | Hydrochloride | 210 |
| 37 | do | H | Cl-8 | H | H | 5 | Free acid | 50–70 |
| 38 | do | Cl-2 | Cl-8 | H | H | 5 | Hydrochloride dihydrate | 150 |
| 39 | do | H | Cl-8 | H | Na | 5 | Sodium salt hemihydrate | |
| 40 | do | H | Cl-7 | H | Na | 5 | Sodium salt tetrahydrate | 160 |
| 41 | do | Cl-3 | Cl-8 | H | Na | 5 | Sodium salt | 170 |
| 42 | do | H | Cl-8 | $CH_3$ | H | 5 | Free acid | 130 |
| 43 | do | H | Cl-8 | H | Na | 10 | Sodium salt | 254 |
| 44 | do | H | F-8 | H | H | 6 | Free acid | |
| 45 | $C_2H_5$ \| –SO₂–N– | H | Br-8 | $C_4H_9$ | H | 6 | do | |
| 46 | $C_3H_7$ \| –SO₂–N– | Br-3 | H | H | $C_3H_7$ | 3 | Hydrochloride | |
| 47 | $C_2H_5$ \| –SO₂–N– | Cl-1 | H | $CH_3$ | H | 5 | do | |
| 48 | Same as above | Cl-4 | H | H | $CH_3$ | 6 | do | |

The new tricyclic compounds and their physiologically tolerable salts possess valuable pharmacological and therapeutic properties especially psychostimulant, antidepressive, analgesic, antitussive, antihistaminic and gastric antisecretory properties.

Their toxicity is low and the $LD_{50}$ studied in mice varies from 150 to > 1000 mg/kg by the intraperitoneal route and from 200 to > 1200 mg/kg by the oral route.

The analgesic activity was studied by the method of Woolf G. and Mac Donald A. D. [J. Pharm. 80, 300 (1944)]. It was found that the compounds of the invention, administered in mice by intraperitoneal route at doses of 5 to 20 mg/kg, increase the threshold of pain perception from 30 to 170 percent.

The antitussive activity was studied by the method of Gooswald R. [Arzfschg 8, 550 (1958)]. The new compounds, administered by subcutaneous route in the guinea-pig at doses of 2 to 20 mg/kg, decrease from 40 to 90 percent the cough of the animals submitted to a 40 percent citric acid aerosol for 4 minutes.

The new compounds inhibit the bronchospasm provoked by intravenous injection of histamine in the guinea-pig [Konzett and Rossler: Arch. Exp. Path. U.

Phar. 195, 71, (1940)]. The spasm is inhibited from 26 to 75 percent by intravenous doses of 2.5 to 5 mg/kg.

The gastric antisecretory activity was studied by the method of H. Shay et al. [Gastroenterology 5, 43 (1945)]. It was observed that the new compounds inhibit the gastric secretion in rat at doses of 5 to 50 mg/kg by intraperitoneal route. The decrease of the volume of gastric secretion in treated animals varies from 20 to 70 percent compared with the untreated animals 4 hours after the ligature of pylorus.

The hereabove described properties, as well as the low toxicity, allow the use of the new compounds in therapy, especially in the treatment of psychoneurotic disorders, pain, cough and gastric hypersecretion.

The present invention also includes pharmaceutical compositions for oral, rectal or parenteral administration, containing a compound of the general formula I or a physiologically tolerable salt thereof, in admixture or conjunction with a suitable pharmaceutical carrier, such, for example, as distilled water, glucose, lactose, talc, starch, magnesium stearate and cocoa butter.

Doses may vary from 10 to 100 mg 1 to 5 times a day.

We claim:

1. A compound selected from the group consisting of:

A. Tricyclic compounds of the formula

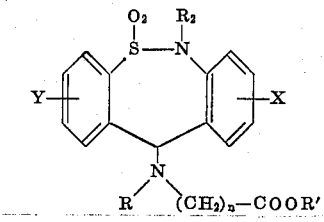

wherein X and Y are each selected from the group consisting of hydrogen, fluorine, chlorine and bromine;

R is selected from the group consisting of hydrogen, lower alkyl having from 1 to 5 carbon atoms;

$R_2$ is a lower alkyl having from 1 to 5 carbon atoms;

R' is selected from the group consisting of hydrogen, lower alkyl having from 1 to 5 carbon atoms and a monovalent cation derived from a physiologically tolerable base; and n is an integer of from 1 to 12 inclusive; and B. the physiologically tolerable acid addition salt when R' is hydrogen or a lower alkyl radical having from 1 to 5 carbon atoms.

2. A compound of claim 1 which is dl 7-[8-chloro-10,10-dioxo-11-methyl-dibenzo (c,f) thiazepin-(1,2)-5-yl] aminoheptanoic acid.

3. A compound of claim 1 which is propyl dl 4-[3-bromo-10,10-dioxo-11-propyldibenzo(c,f) thiazepin (1,1)-5-yl] aminobutyrate.

4. A compound of claim 1 which is dl 6-[8-chloro-10,10-dioxo-11-methyl-dibenzo(c,f) thiazepin (1,2)-5-yl] aminohexanoic acid.

5. A compound of claim 1 which is sodium dl 6-[8-chloro-10,10-dioxo-11-methyl-dibenzo (c,f) thiazepin (1,2)-5-yl] aminohexanoate salt.

6. A compound of claim 1 which is the hydrochloric acid addition salt of dl 6-[2,8-dichloro-10,10-dioxo-11-methyl-dibenzo(c,f) thiazepin (1,2)-5-yl] aminohexanoic acid.

7. A compound of claim 1 which is sodium dl 11-[8-chloro-10,10-dioxo-11-methyl-dibenzo (c,f) thiazepin (1,2)-5-yl] aminoundecanoate salt.

* * * * *